(12) United States Patent
Marshall

(10) Patent No.: US 9,957,175 B2
(45) Date of Patent: May 1, 2018

(54) VERTICAL ACIDIC FLUID NEUTRALIZER

(71) Applicant: Nathan Marshall, Oak Creek, CO (US)

(72) Inventor: Nathan Marshall, Oak Creek, CO (US)

(*) Notice: Subject to any disclaimer, the term of this patent is extended or adjusted under 35 U.S.C. 154(b) by 391 days.

(21) Appl. No.: 14/953,285

(22) Filed: Nov. 27, 2015

(65) Prior Publication Data

US 2016/0145128 A1    May 26, 2016

Related U.S. Application Data

(60) Provisional application No. 62/085,036, filed on Nov. 26, 2014.

(51) Int. Cl.
| | | |
|---|---|---|
| *B01D 53/40* | (2006.01) | |
| *C02F 1/66* | (2006.01) | |
| *C02F 1/68* | (2006.01) | |

(52) U.S. Cl.
CPC ............ *C02F 1/66* (2013.01); *B01D 53/40* (2013.01); *B01D 2251/60* (2013.01); *C02F 1/688* (2013.01); *C02F 2201/006* (2013.01)

(58) Field of Classification Search
CPC .. C02F 1/66; C02F 1/687; C02F 1/688; C02F 2201/006; B01F 2001/0055; B01F 2001/0061; B01D 53/40; B01D 2251/60; B01D 2251/602; B01D 2251/604; B01D 2251/606; B01D 2251/608
See application file for complete search history.

(56) References Cited

U.S. PATENT DOCUMENTS

| | | | |
|---|---|---|---|
| 3,148,951 A | 9/1964 | Avery et al. | |
| 3,708,266 A | 1/1973 | Gustavsson | |
| 4,289,730 A | 9/1981 | Tomlinson et al. | |
| 4,309,947 A | 1/1982 | Ketterer | |
| 4,444,156 A | 4/1984 | Iwasaki et al. | |
| 4,543,892 A | 8/1985 | Tomlinson et al. | |
| 6,550,264 B1* | 4/2003 | Cantolino | C02F 1/688 210/199 |
| 2005/0224338 A1* | 10/2005 | Kin | C02F 1/463 204/230.2 |
| 2005/0247644 A1* | 11/2005 | Chapple | C02F 1/66 210/749 |
| 2012/0156117 A1* | 6/2012 | Hoce | B01D 53/40 423/210 |

* cited by examiner

*Primary Examiner* — Lucas Stelling
(74) *Attorney, Agent, or Firm* — John A. Arsenault; Daniel Dubuisson

(57) ABSTRACT

A device and method are provided for neutralizing corrosive fluids that discharge from several types of condensing appliances. The disclosed device comprises a flow enclosure and a flow channel concentrically aligned with an inlet connection positioned on an upper cap and aligned substantially perpendicular to an outlet connection also positioned on the upper cap, thus allowing the disclosed device to further serve as a gas trap. Replacement of the neutralizing media housed within the flow enclosure may proceed without disconnecting the device at the inlet.

20 Claims, 3 Drawing Sheets

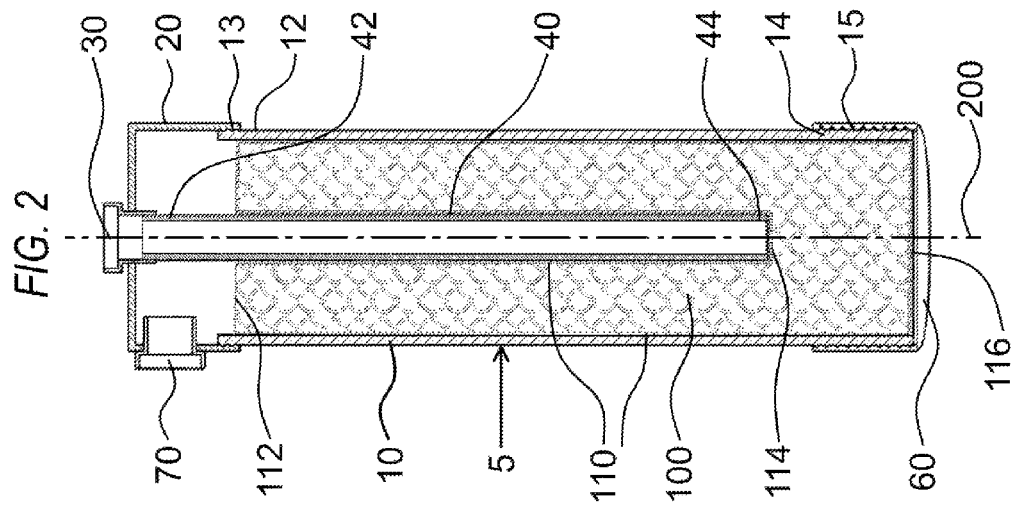
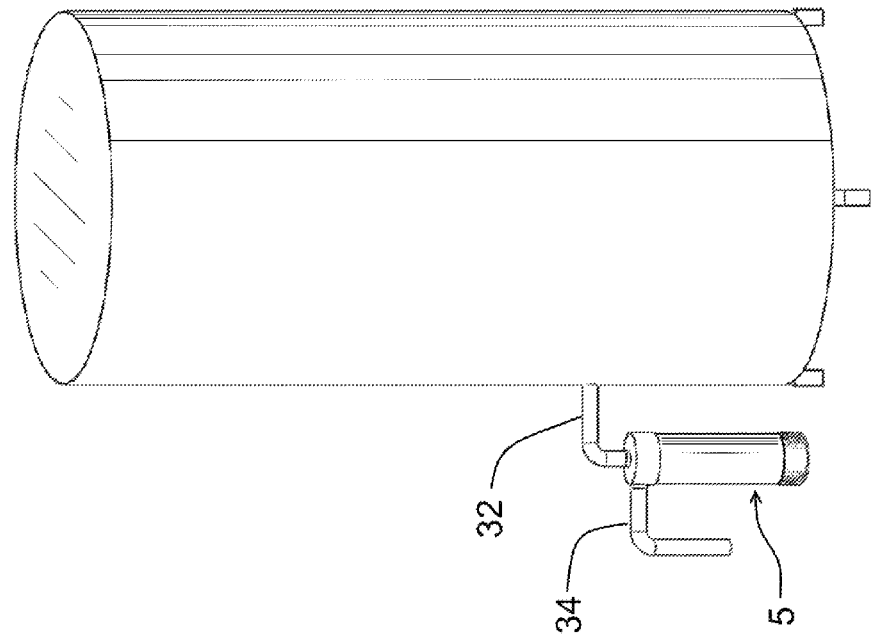

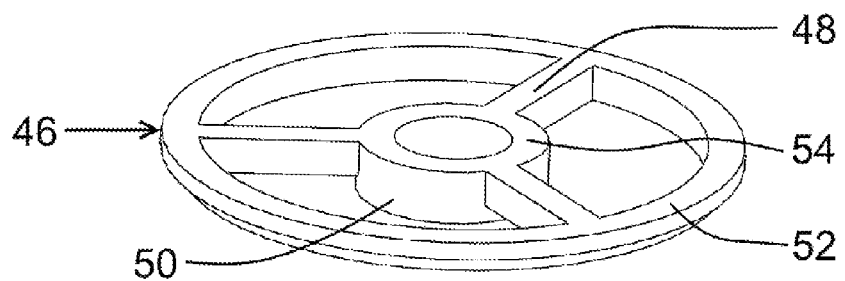
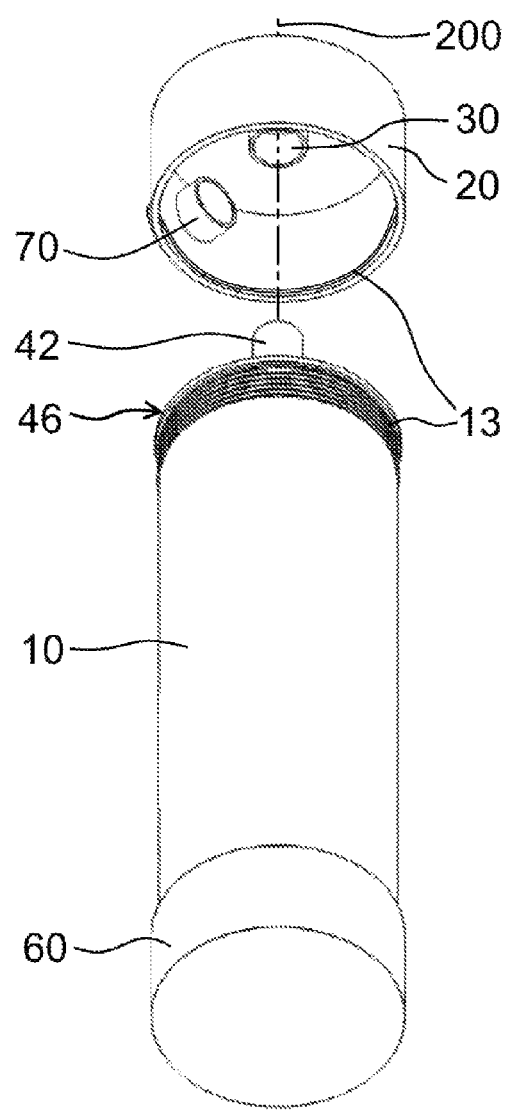

VERTICAL ACIDIC FLUID NEUTRALIZER

CROSS-REFERENCE TO RELATED APPLICATIONS

This application is claims the benefit of the earliest available effective filing date from U.S. Provisional Patent Application No. 62/083,036 titled "Vertical Condensate Neutralizer," filed Nov. 26, 2014 under 35 USC § 119(e).

STATEMENT REGARDING FEDERALLY SPONSORED RESEARCH AND DEVELOPMENT

Not Applicable.

BACKGROUND OF DISCLOSURE

1. Field of Invention

The present invention generally relates to the treatment of corrosive fluids produced by appliances and more particularly to the neutralization and channeling of acidic condensate produced by condensing appliances.

2. Description of Prior Art

Devices that neutralize acidic fluids produced by condensing appliances are necessary for reducing environmental impact and user safety. A variety of neutralizing devices are well known but suffer from significant disadvantages. U.S. Pat. No. 3,148,951 to Avery discloses an exhaust gas purifier comprising an elongated hollow cartridge with an end closure means and having perforations around the periphery that are small enough for retention of catalyst pellets and large enough for free flow of gas therethrough. An agitation rod having a plurality of bends utilizes motion of the exhaust gases to agitate pellets and prevent them from fusing together. U.S. Pat. No. 4,309,947 to Ketterer discloses a mounting arrangement for a condensate neutralizer in a furnace whereby products of combustion from the furnace are separated and neutralized.

The prior art describes devices for neutralizing or purifying the discharge of condensing appliances. Unfortunately, after a period of time, neutralizing devices will lose performance as the neutralizing media is consumed. Replacement of the neutralizing media becomes troublesome for the devices described in the prior art and often requires either replacement of the entire device or replacement of expensive components of the device, which is usually accompanied by disconnecting the device at multiple locations. The present device exhibits a concentric design with perpendicular inlet and outlet connections to overcome these disadvantages, as well as others, by enabling gravity to feed unused neutralizing media towards the lower portion of the device where the media has been expended. Additionally, several components of the present invention are releasably fastened to allow simple and cost efficient replacement of the neutralizing media and other components.

SUMMARY OF THE DISCLOSURE

A device and method are provided for neutralizing corrosive fluids that discharge from several types of condensing appliances. In a preferred embodiment, the device comprises a flow enclosure having an upper end portion and a lower end portion, an upper cap fastened to the upper end portion via a first fastening mechanism, a lower cap fastened to the lower end portion via a second fastening mechanism, an inlet connection adjoined with and in fluid communication with the upper cap, an outlet connection adjoined with and aligned substantially perpendicular to the upper cap, a flow channel having a channel proximal end and a channel distal end, and a neutralizing media for reacting with a fluid to raise the pH of the fluid, wherein the channel proximal end is in fluid communication with the inlet connection and extends towards the lower cap and terminates at the channel distal end, wherein the outlet connection is positioned at lower elevation than the inlet connection, wherein the flow channel, the flow enclosure and the inlet connection are aligned substantially concentric about a central axis.

In an embodiment, the first fastening mechanism or the second fastening mechanism is selected from the group consisting of an adhesive, substantial friction between the upper end portion and the upper cap, one or more clips, one or more O-rings, or a union connection, and the upper cap being internally threaded to match external threading of the upper end portion.

In an embodiment, the flow enclosure or flow channel further comprises a material exhibiting at least partial transparency for monitoring appearance of the neutralizing media. In an embodiment, the inlet connection or the outlet connection is an integral union connection.

In an embodiment, the flow enclosure, the lower cap, the flow channel, and the neutralizing media are a replaceable cartridge. In a further embodiment, the replacement cartridge further comprises a channel bracket for aligning the flow channel concentrically with the flow enclosure, wherein the channel bracket comprises a bracket inner ring, a bracket outer ring, and at least one bracket arm extending radially from the bracket inner ring to the bracket outer ring. In a further embodiment, the bracket arms are positioned symmetrically about the central axis. In a further embodiment, the bracket inner ring comprises a bracket elongation for enhancing alignment of the flow channel with the flow enclosure, wherein the bracket elongation extends along the central axis towards the upper cap, towards the lower cap, or both.

In an embodiment, the neutralizing media comprises a form barrier for supporting and maintaining a distinct form of the neutralizing media, wherein the form barrier comprises pores substantially smaller than the neutralizing media for allowing passage of fluid and restricting passage of the neutralizing media. In an embodiment, the neutralizing media further comprises an indicator material for substantially altering appearance of the neutralizing media during operation.

The positions and orientations of the inlet connection and flow channel relative to the outlet connections on the upper cap enables the disclosed device to further act as a gas trap to remove fluid in vapor phase from the fluid entering the device.

In a preferred embodiment, the method for neutralizing a fluid generated by a condensing apparatus using the disclosed device comprises the steps of fluidly communicating the fluid into a flow channel via an inlet connection positioned on an upper cap, fluidly communicating the fluid from the flow channel towards a lower cap and into a flow enclosure, wherein the flow enclosure comprises a neutralizing media, wherein the flow enclosure is fastened to the lower cap and the upper cap, and wherein the flow enclosure, the flow channel, and the inlet connection are aligned concentrically. In an embodiment, the method further comprises the step of fluidly communicating the fluid from the flow enclosure therethrough an outlet connection, wherein the outlet connection is oriented substantially perpendicular to the inlet connection and positioned at lower elevation than the inlet connection. In an embodiment, the method further comprises the step of unfastening a replacement cartridge from the upper cap, wherein the replacement cartridge comprises the flow enclosure, the neutralizing media, the flow channel, and the lower cap. A further embodiment of the method comprises the step of fastening a second replacement cartridge to the upper cap, wherein the second replacement cartridge comprises a second flow enclosure, a second neutralizing media, a second flow channel, and a second lower cap.

DESCRIPTION OF THE DRAWINGS

FIG. 1 is a perspective view of a neutralizer device installed to a condensing appliance outlet, in accordance with an exemplary embodiment of the present invention;

FIG. 2 is a side cut away view of the neutralizer device shown in FIG. 1 displaying interior components, in accordance with an exemplary embodiment of the present invention;

FIG. 5 is a perspective view of the channel bracket in FIG. 4, in accordance with an exemplary embodiment of the present invention; and FIG. 6 is lowered perspective view of the replacement cartridge in FIG. 4 being inserted into and fastened to an upper cap of a neutralizer device, in accordance with an exemplary embodiment of the present invention.

Figure 3:
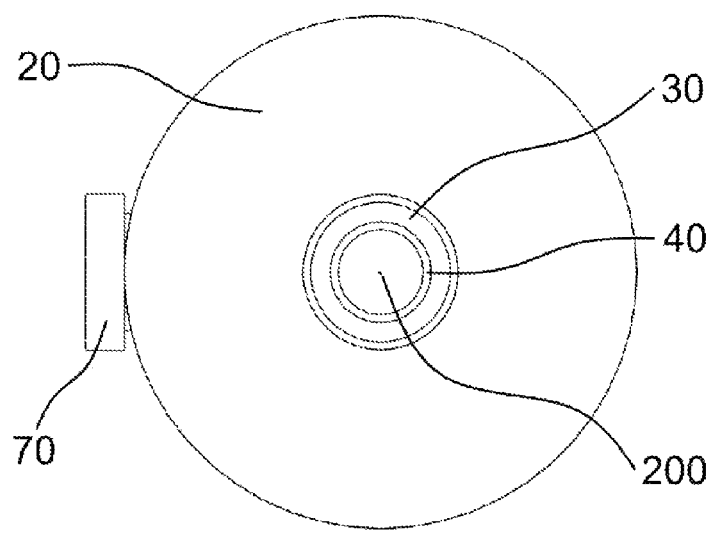
FIG. 3 is a top view of the neutralizer device displayed in FIG. 1 showing the concentric geometry of the flow enclosure and flow channel, in accordance with an exemplary embodiment of the present invention.

REFERENCE NUMERALS IN THE DRAWINGS neutralizing device 5
flow enclosure 10
upper end portion 12
first fastening mechanism 13
lower end portion 14
second fastening mechanism 15
upper cap 20
inlet connection 30
condensing appliance outlet 32
discharge pipe 34
flow channel 40
channel proximal end 42
channel distal end 44
channel bracket 46
bracket arm 48
bracket elongation 50
bracket outer ring 52
bracket inner ring 54
lower cap 60
outlet connection 70
neutralizing media 100
form barrier 110
top barrier 112
lower inner barrier 114
lower barrier 116
replacement cartridge 120
central axis 200

DETAILED DESCRIPTION OF THE DISCLOSED EMBODIMENT

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail to avoid unnecessarily obscuring the description of the embodiments.

FIG. 1 is a perspective view of a neutralizer device 5 installed to a condensing appliance outlet 32, in accordance with an exemplary embodiment of the present invention. The neutralizer device comprises a flow enclosure 10, an upper cap 20 secured to the enclosure upper end portion 12, a lower cap 60 fastened to the enclosure lower end portion 14, an inlet connection 30 adjoined with and substantially concentrically to the upper cap 20 and in fluid communication with the condensing appliance outlet 32, an outlet connection 70 adjoined with and substantially perpendicular to the upper cap 20 and at a lower elevation than the outlet connection 70. A discharge pipe 34 may be fastened to the outlet connection 70 to fluidly communicate the resulting fluid from the device to a desired location. The positions and orientations of the inlet connection 30 and outlet connection 70 reduce the time to replace or install the neutralizer device onto an appliance.

FIG. 2 is a side cut away view of the neutralizer device 5 shown in FIG. 1 displaying interior components, in accordance with an exemplary embodiment of the present invention. The neutralizer device comprises a neutralizing media 100 and a flow channel 40 in the form of a tubular extension with a channel proximal end 42 in fluid communication with the inlet connection 30 and extending towards the lower cap 60. The neutralizing media 100, which reacts with an acidic fluid to raise the pH of the fluid, may comprise calcium carbonate, magnesium carbonate, calcium oxide, magnesium oxide, calcite, other alkaline earth hydroxides, bicarbonates, carbonates, or any combination thereof, and may further comprise an indicator material for allowing the neutralizing media to change color or other aspects of appearance as the neutralizing material is utilized. The neutralizing media 100 may take the form of an ellipsoid, a cylinder, a polyhedron, a form matching the form of the flow enclosure 10, and may take the form of an aggregate, pellets, a granular material, or any combination of forms thereof. The upper cap 20 may be secured to the enclosure upper portion 12 by an adhesive, by substantial friction between the enclosure upper portion 12 and the upper cap 20, by sealing with one or more O-rings, or by being internally threaded to match external threading of the enclosure upper portion 12. The example embodiment shown in FIG. 1 and FIG. 2 displays a flow enclosure 10 taking the form of a hollowed elliptic cylinder; however, it is contemplated that other geometric shapes would suffice, wherein other suitable forms of the flow enclosure 10 may include, but are not limited to, in part or in full, a hollowed rectangular prism, tubular forms, and other forms having polygonal or elliptical cross-sections along the central axis 200.

During operation, acidic condensate enters the flow channel 40 via the inlet connection 30, then traverses therethrough and exits the flow channel 40 at the channel distal end 44. The acidic condensate then flows radially and ascends the porous volume interior to the flow enclosure 10 and comprising the neutralizing media 100. Reaction between the neutralizing media 100 and the acidic condensate occurs within the flow enclosure 10 and results in the fluid at the outlet connection 70 being a higher pH than the fluid at the inlet connection 30. Furthermore, the fluid in the neutralizer device often comprises sludge and precipitates formed during the neutralization reaction, and the mild fluid flow in the porous volume interior to the flow enclosure 10 enables sludge and precipitates to traverse towards and be retained at the lower cap 60 during operation of the device.

The lower cap 60 may further comprise a grating, sieve, or thin drilled sheet to enhance the isolation of sludge and precipitates away from the outlet connection 70. In an embodiment, the lower cap 60 takes the form of a thick homoeoid to further enhance the operation and maintenance of the neutralizing device by redirecting flow of the fluid exiting the channel towards the outlet connection 70. It is contemplated that several forms of the lower cap may be suitable for the present invention; these may include, but are not limited to, hollowed conical forms, hollowed cylindrical forms, or capped hollowed forms exhibiting cross-section areas that match the cross-sectional area of the flow enclosure 10. In the example embodiment shown in FIG. 2, both the first fastening mechanism 13 of the upper cap 20 to the flow enclosure 10 and the second fastening mechanisms 15 of the lower cap 60 to the flow enclosure 10 occurs by the flow enclosure 10 being externally threaded to match internal threading of the upper cap 20 and lower cap 60, respectively at the upper end portion 13 and lower end portion 14; however, it is contemplated that numerous other fastening mechanisms will suffice, which may include but are not limited to, an adhesive, one or more clips, one or more O-rings, or a union connection. This example embodiment demonstrates the significant reduction in the amount of time to replace the neutralizing media 100 and remove sludge and precipitates that collect in the lower cap 60.

FIG. 3 is a top view of the neutralizer device displayed in FIG. 1 showing the concentric geometry of the flow enclosure 10 and flow channel 40, in accordance with an exemplary embodiment of the present invention. In embodiments, the flow channel 40 may take take the form of a rigid tubular extension, a pliable tubular extension, or forms exhibiting an elliptical or polygonal cross-sections with respect to the central axis. Likewise, the flow enclosure 10 may take the form of a hollowed tubular extension, a pliable tubular extension, or forms exhibiting an elliptical or polygonal cross-sections with respect to the central axis. Either one of the flow enclosure 10 or the flow channel 40 may further comprise a material exhibiting at least partial transparency to enable a user to monitor the interior of the neutralizing device. In an embodiment, the inlet connection 30 or the outlet connection 70 may take the form of an integral union connection, or may generally further comprise a valve, for enhancing control of fluid flow within the neutralizing device and for allowing the neutralizer to be removed or replaced without disturbing the piping adjacent to and in contact with the neutralizer device.

The components of the neutralizing device comprise a material substantially resistant to corrosive fluids at elevated temperatures, which may include, but is not limited to, poly(vinyl chloride), poly(propylene), poly(ethylene), poly(aryletherketones), stainless steels, fluorinated polymers, glass, or combinations thereof.

Figure 4:
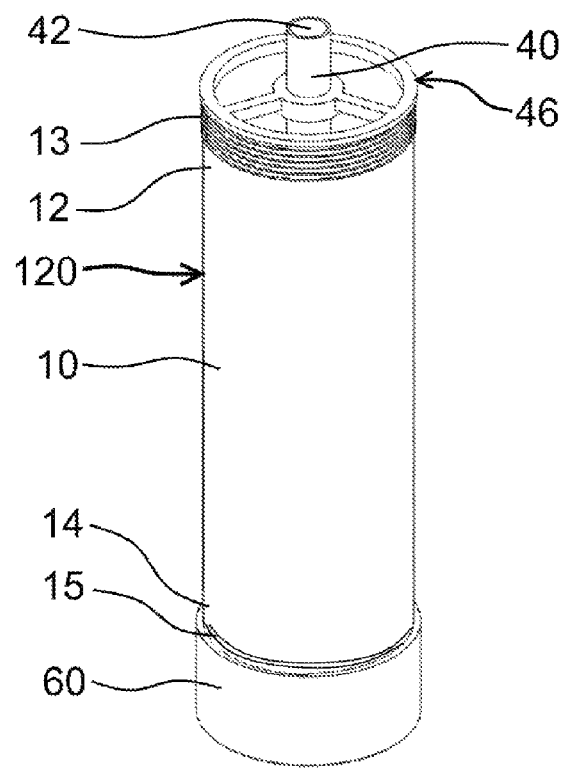
FIG. 4 is a perspective view of a replacement cartridge for a neutralizer device, in accordance with an exemplary embodiment of the present invention.

FIG. 4 is a perspective view of a replacement cartridge for a neutralizer device, in accordance with an exemplary embodiment of the present invention. In an embodiment, a combination of the flow enclosure 10, lower cap 60, and flow channel 40 compose a replaceable cartridge 120. In a further embodiment, the replacement cartridge 120 comprises a channel bracket 46 for aligning the flow channel substantially concentric with the flow enclosure 10.

FIG. 5 is a perspective view of the channel bracket 46 in FIG. 4, in accordance with an exemplary embodiment of the present invention. The channel bracket 46 removably fastens to the upper end portion 12 at the bracket outer ring 52 and removably fastens to the flow channel 40 adjacent to the channel proximal end 42 via a bracket inner ring 54. At least one bracket arm 48 extends radially from bracket inner ring 54 to the bracket outer ring 52. In an embodiment, the bracket inner ring 54 comprises a bracket elongation 50, which may be an extension of the bracket inner ring 54 in either or both directions about the central axis 200.

FIG. 6 is lowered perspective view of the replacement cartridge in FIG. 4 being inserted into and fastened to an upper cap 20 of a neutralizer device, in accordance with an exemplary embodiment of the present invention. Upon reversibly fastening the flow enclosure 10 of the replacement cartridge 120 to the lower cap 60 at the upper end portion 12, the channel proximal end 42 inserts reversibly into and becomes in fluid communication with the inlet connection 30. The neutralizing media 100 may be easily replaced by adding the neutralizing media 100 directly into the flow enclosure 10. Alternatively, the neutralizing media 100 may take the form of a replacement manufactured neutralizing media cartridge shaped as a hollowed cylinder designed to fit between the flow enclosure 10 and flow channel 40, whereby the neutralizing media cartridge comprises a form barrier 110 for supporting and maintaining the form of the neutralizing media 100, and wherein the form barrier 110 comprises a top barrier 112 and an inner lower barrier 114 both having pores substantially smaller than the neutralizing media 100 for allowing passage of fluid and restricting passage of the neutralizing media 100. The form barrier 110 may further comprise a lower barrier 116 designed to match the interior form of the lower cap 60.

While the above described embodiments depicts the invention applied directly to a furnace heater, the embodiments may also be applied to other types of condensing appliances, which include, but are not limited to other types of furnaces, boilers, tankless water heaters, and roof top heating units.

While particular embodiments of the invention have been described and disclosed in the present application, it is clear that any number of permutations, modifications, or embodiments may be made without departing from the spirit and the scope of this invention. Accordingly, it is not the inventor's intention to limit this invention in this application, except as by the claims.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

I claim:

1. A neutralizer device comprising:
   a flow enclosure having an upper end portion and a lower end portion;
   an upper cap fastened to said upper end portion via a first fastening mechanism;
   a lower cap fastened to said lower end portion via a second fastening mechanism;
   an inlet connection adjoined with and in fluid communication with said upper cap;
   an outlet connection adjoined with and aligned substantially perpendicular to said inlet connection, wherein said outlet connection is positioned at lower elevation than said inlet connection;
   a flow channel having a channel proximal end and a channel distal end, wherein said channel proximal end is in fluid communication with said inlet connection and extends towards said lower cap and terminates at said channel distal end, wherein said flow channel, said flow enclosure and said inlet connection are aligned substantially concentric about a central axis;
   a neutralizing media for reacting with a fluid to raise the pH of the fluid; and
   an inner lower barrier having pores substantially smaller than the neutralizing material covering an opening of the flow channel distal end.

2. The neutralizer device of claim 1, wherein said first fastening mechanism is selected from the group consisting of an adhesive, substantial friction between said upper end portion and said upper cap, one or more clips, one or more O-rings, or a union connection, and said upper cap being internally threaded to match external threading of said upper end portion.

3. The neutralizer device of claim 1, wherein said second fastening mechanism is selected from the group consisting of clips, substantial friction between said lower end portion and said lower cap, one or more clips, one or more O-rings, or a union connection, and said lower cap being internally threaded to match external threading of said lower end portion.

4. The neutralizer device of claim 1, wherein said lower cap takes a form selected from the group consisting of a thick semi-homoeoid, hollowed conical forms, hollowed cylindrical forms, and capped hollowed forms exhibiting a cross-section area matched to said flow enclosure.

5. The neutralizer device of claim 1, wherein said neutralizing media is selected from the group consisting of alkaline earth hydroxides, bicarbonates, and carbonates.

6. The neutralizer device of claim 1, wherein said neutralizing media takes a form selected from the group consisting of an ellipsoid, a cylinder, and a polyhedron.

7. The neutralizer device of claim 1, wherein said neutralizing media further comprises an indicator material for substantially altering appearance of said neutralizing media during operation.

8. The neutralizer device of claim 1, wherein said flow enclosure, said lower cap, said flow channel, and said neutralizing media are a replaceable cartridge.

9. The neutralizer device of claim 8, wherein said neutralizing media comprises a form barrier for supporting and maintaining a distinct form of said neutralizing media, wherein said form barrier comprises pores substantially smaller than said neutralizing media for allowing passage of fluid and restricting passage of said neutralizing media, wherein the form barrier comprises the inner lower barrier.

10. The neutralizer device of claim 1, wherein said flow channel takes a form selected from the group consisting of a rigid tubular extension, a pliable tubular extension, forms exhibiting an elliptical cross-section with respect to said central axis, and forms having a polygonal cross-section with respect to said central axis.

11. The neutralizer device of claim 1, wherein said flow enclosure takes a form selected from the group consisting of a hollowed tubular extension, a pliable tubular extension, forms exhibiting an elliptical cross-section with respect to said central axis, and forms having a polygonal cross-section with respect to said central axis.

12. The neutralizer device of claim 1, wherein said flow enclosure or flow channel further comprises a material exhibiting at least partial transparency for monitoring appearance of said neutralizing media.

13. The neutralizer device of claim 1, wherein said inlet connection or said outlet connection is an integral union connection.

14. The neutralizer device of claim 8, wherein said replacement cartridge further comprises a channel bracket for aligning said flow channel concentrically with said flow enclosure, wherein said channel bracket comprises a bracket inner ring, a bracket outer ring, and at least one bracket arm extending radially from said bracket inner ring to said bracket outer ring.

15. The neutralizer device of claim 14, wherein said bracket inner ring comprises a bracket elongation for enhancing alignment of said flow channel with said flow enclosure, wherein said bracket elongation extends along said central axis.

16. The neutralizer device of claim 14, wherein said channel bracket comprises a plurality of bracket arms positioned symmetrically about said central axis.

17. A neutralizer device comprising:
a flow enclosure having an upper end portion and a lower end portion;
an upper cap releasably fastened to said upper end portion via a first fastening mechanism;
a lower cap securely fastened to said lower end portion;
an inlet connection adjoined with, in fluid communication with, and positioned substantially concentrically with said upper cap;
an outlet connection adjoined with and substantially perpendicular with said inlet connection, wherein said outlet connection is positioned at lower elevation than said outlet connection;
a flow channel aligned substantially concentric with said flow enclosure and having a channel proximal end and a channel distal end, wherein said channel proximal end is in fluid communication with said inlet connection and extends towards said lower cap and terminates at said channel distal end;
a neutralizing media for reacting with a fluid to raise the pH of the fluid, wherein said neutralizing media takes a form of a replacement media cartridge; and
an inner lower barrier having pores substantially smaller than the neutralizing material covering an opening of the flow channel distal end.

18. A method for neutralizing a fluid generated by a condensing apparatus, said method comprising the steps of:
fluidly communicating said fluid into a flow channel via an inlet connection positioned on an upper cap, said flow channel having a channel proximal end and a channel distal end, wherein the channel proximal end is in fluid communication with said inlet connection and extends towards said lower cap and terminates at said channel distal end;
passing said fluid out an inner lower barrier having pores, the inner lower barrier covering an opening of the distal end of the flow channel;
fluidly communicating said fluid from said flow channel towards a lower cap and into a flow enclosure, wherein said flow enclosure comprises a neutralizing media, wherein said flow enclosure is fastened to said lower cap and said upper cap, wherein said flow enclosure, said flow channel, and said inlet connection are aligned concentrically, and wherein said inner lower barrier pores are substantially smaller than said neutralizing media;
fluidly communicating said fluid from said flow enclosure there through an outlet connection, wherein said outlet connection is oriented substantially perpendicular to said inlet connection and positioned at lower elevation than said inlet connection.

19. The method of claim 18, further comprising the step of:
unfastening a replacement cartridge from said upper cap, wherein said replacement cartridge comprises said flow enclosure, said neutralizing media, said flow channel, and said lower cap.

20. The method of claim 19, further comprising the steps of:
fastening a second replacement cartridge to said upper cap, wherein said second replacement cartridge comprises a second flow enclosure, a second neutralizing media, a second flow channel, and a second lower cap.

* * * * *